United States Patent
Klein

(10) Patent No.: US 6,259,367 B1
(45) Date of Patent: Jul. 10, 2001

(54) LOST AND FOUND SYSTEM AND METHOD

(76) Inventor: Elliot S. Klein, 210 E. 15th St., New York, NY (US) 10033

( * ) Notice: Subject to any disclaimer, the term of this patent is extended or adjusted under 35 U.S.C. 154(b) by 0 days.

(21) Appl. No.: 09/562,937

(22) Filed: May 1, 2000

Related U.S. Application Data

(60) Provisional application No. 60/156,453, filed on Sep. 28, 1999.

(51) Int. Cl.[7] .................................................. G08B 13/14
(52) U.S. Cl. ................................... 340/572.1; 340/568.1; 235/375
(58) Field of Search ......................... 340/568.1, 568.6, 340/568.7, 571, 572.1, 572.7, 825.36, 825.49, 539; 235/375, 385, 487, 488

(56) References Cited

U.S. PATENT DOCUMENTS

| | | | |
|---|---|---|---|
| 4,271,352 | * | 6/1981 | Thomas ................................. 235/375 |
| 5,732,401 | * | 3/1998 | Conway ................................. 705/29 |
| 5,809,481 | * | 9/1998 | Baron et al. ........................... 705/14 |
| 5,841,116 | | 11/1999 | Lewis .................................... 235/375 |
| 5,933,829 | | 8/1999 | Durst ...................................... 707/10 |
| 5,936,527 | | 8/1999 | Isaacman ........................... 340/572.1 |
| 5,949,335 | | 9/1999 | Maynard ............................ 340/572.1 |
| 5,955,965 | | 9/1999 | Colandruccio ................... 340/825.49 |
| 5,962,834 | * | 10/1999 | Markman ............................... 235/385 |
| 6,025,780 | * | 2/2000 | Bowers et al. ..................... 340/572.3 |
| 6,040,774 | | 3/2000 | Schepps ............................. 340/572.1 |

* cited by examiner

*Primary Examiner*—Van T. Trieu
(74) *Attorney, Agent, or Firm*—Michael B. Fein; Cozen & O'Connor

(57) ABSTRACT

The present invention is a system and method for identifying and returning an object includes affixing to the object a passive two-way communication circuit such as a frangible radio security tag or smart label. The tag or label, when operational, is arranged to receive a remotely generated request for status information and, responsive to the request, to transmit status information to a remote device. If desired, the radio tag can be incorporated into a printed label, each label having an adhesive side and a printable side with information to notify the 'finder' of a tagged item to coordinate return to its registered owner by contacting a courier, postal or other delivery service network. In the event that a tagged item should become misplaced, the carrier and the supplier can cooperate to locate it and inform the owner of its whereabouts by using the information provided upon enrollment to an electronic 'lost and found' network service. In a preferred embodiment, a Web browser program is launched in response to e-mail, and return tracking at the URL of the vendor's Web site is accessed through the Internet.

8 Claims, 11 Drawing Sheets

LOST AND FOUND SYSTEM AND METHOD

CROSS REFERENCE TO RELATED APPLICATIONS

This application claims the benefit of provisional patent application Ser. No. 60/156,453 filed on Sep. 28, 1999.

BACKGROUND OF THE INVENTION

1. Field of the Invention

The present invention relates automated systems and methods for retrieving lost objects.

2. Description of the Prior Art

The use of identification tags and reward offers is the most well known and prevalent method for returning lost objects to their owners. For example, tags may be placed on luggage, cell phones, computer equipment, or any object capable of being lost, and making it possible for the finder to locate the owner to arrange for return and possible reward by the owner to the finder.

Traditional identification tags have certain disadvantages, for example, they reveal the owner's name, address, and possibly phone numbers, causing loss of privacy and security risks. Many owners will not use identification tags which reveal their true names, etc., because the risk of unethical people misusing that discovering and misusing that information is too high.

The idea of encoding the owner's private information on an identification tag has been proposed by others, but prior methods require registering the encoded information with a third party, and for the finder to return the lost object to the third party who, in turn, returns the lost object to the owner.

Recently Lewis U.S. Pat. No. 5,841,116 has proposed using bar code labels bearing pre-identified insignia corresponding to a unique owner, and a system wherein the labels are placed on the owner's objects and the identifying data is stored on a computer at a central location, and if the object is lost and then found by a third party finder, the ownership can be determined by use of a bar code scanner and transmission of a query based on the scanned identifier to the computer at the central location.

There are certain disadvantages to bar code systems: because they are optical, obscuring of the label (or of the bar code reader lens) by exposure to dirt, dust, water, ink, or paint will make the label unreadable. Furthermore, ink bleeding, stray marks, dropouts, label warping, and label tearing are problems with bar code labels, especially when the label must stay in place and be readable for several years. A further problem is that bar codes can be copied through mechanical means such as photocopying. In addition, bar coded information cannot be erased, rewritten, or appended.

Isaacman et al, U.S. Pat. No. 5,936,527, have proposed a method and apparatus for locating and tracking documents and other objects for office files using radio frequency identification tags on the files for locating tagged documents within shelves and drawers.

SUMMARY OF THE INVENTION

There exists a need for better electronic location systems, particularly systems that can accommodate the tracking of individual personal belongings such as pagers, cellular phones, other handheld computing devices, baggage, eyeglasses, pocketbooks, wallets, keys, smartcards used for authorized access to rooms and buildings, bicycles, motorcycles, and any other object subject to being misplaced.

There also exists a need for systems and methods that would permit automatic lost property identification, as well as permit immediate or real time location and retrieval of objects in diverse environments.

Moreover, simple systems for locating and/or retrieving objects which can be incorporated into a conventional express courier, postal or other commercial data processing or communications infrastructure would likewise enhance efficiency while also achieving a cost economy as a result of integration with existing hardware and/or software.

The present invention comprises in one aspect a system for returning lost objects to their owners comprising RFID tags on which are electronically recorded unique identification codes and visible printed instructions for returning the object, if lost, to a location, an RFID tag reader at the location, a computer which receives the unique identification code read by the RFID tag reader and provides owner information corresponding to the unique identification code.

In another aspect, the invention comprises a method for returning lost objects to their owners comprising providing a radio frequency identification (RFID) tag to the owner for application to the owner's object or supplying the object with the tag preaffixed, the tag having a unique identification code number electronically recorded within the tag and a visible printed request to any finder to return the object if lost to any of a set of specified locations or package delivery services; storing the unique identification code number and corresponding owner information, including owner address information and owner billing account information, in a computer system which is accessible by the set of specified locations and/or package delivery services; providing RFID tag readers at the specified locations and/or package delivery services; upon return of any lost object by the finder to any specified locations and/or package delivery service location, reading the RFID tag identification code number, accessing the corresponding owner information from the computer system, returning the object to the owner, and using the owner's billing account information to charge the owner for the return of the object to the owner.

In some embodiments, the method comprises a) encoding a RFID signal into an automated data capture file location pointer into a radio frequency readable identification (ID) code number; b) rendering said radio frequency-readable code number within a data carrier; c) transposing an input data string from said radio frequency-readable ID code number with a computer input device coupled to said client computer; d) parsing said input data string to determine said file location pointer; and e) utilizing said file location pointer to request the computer file designated thereby.

The invention also includes a computer system comprising: a) a client computer and b) a computer input device coupled to said client computer adapted to read a RFID readable code from a data carrier and transmit to said client computer an input data string; wherein said client computer comprises processing means for transposing said input data string to a plurality of constituent fields, said fields comprising at least a file location pointer; means for utilizing said file location pointer to it request the computer file designated thereby.

The invention preferably utilizes automatic identification and data capture technologies embedded into a smart label or tag with a printed surface, referred to herein as an intelligent label or tag since it stores information used to automatically access the information. The radio frequency-readable identification (ID) comprises encoded source data, wherein the source data comprises application launch information as well as file location information. The source data is encoded and printed, and then distributed by the vendor by any logical means to the end user. The end user then reads the ID code via appropriate radio frequency-reader device equipment, decodes the raw decoded data, and the file location information is then used to access the appropriate file. In a preferred embodiment, a Web browser program is launched, and the URL of the vendor's Web site is accessed through the Internet. Local file retrieval may also be implemented on the client computer itself, as well as over an Intranet or LAN environment In particular, the present invention is a method and system for a computer, such as a client computer in a networked computer system, to retrieve a computer file in which a symbol data string comprising a file location pointer is encoded into a radio frequency tag such as an RFID silicon tag, and the radio frequency ID is rendered within a data carrier (e.g. printed on an intelligent document). A computer input device such as a RFID reader device (handheld or fixed) is coupled to the client computer and transposes an input data string from the RFID tag. The computer parses the input data string to determine the file location pointer, and the file location pointer is then utilized pointer to request the computer file designated thereby.

The target server computer may then utilize the source identifier data string received as part of the file transfer request word to access a lookup table which is either be stored locally on the target server computer, or it may be stored remotely on a secondary server computer.

The automatic identification and data capture technologies, specifically an RFID label or tag, may also have encoded therein an executable command to launch a software utility resident on the client computer, and the software utility is then automatically launched after the radio frequency readable ID is transposed. For example, the software utility may be an Internet browser program or launch a URL to a website designed to help track and recover the missing item. In addition, specific functions may also be encoded in the smart label or tag along with the application launch command, such as a command to execute a print job of the retrieved computer identification and related instructions file.

The technical field of this invention is electronic communication systems and, in particular, systems for locating and/or retrieving objects by radio frequency interrogation of an object displaying a smart tag or label to detect the presence of unique identification information to facilitate its rapid return processing.

DETAILED DESCRIPTION OF THE PREFERRED EMBODIMENT

The present invention will be described in greater detail with respect to the preferred embodiment with reference to the drawings so as to exemplify the invention. Various alternatives, refinements, and substitutions should become readily apparent based on the principles of the invention illustrated herein.

Figure 1:
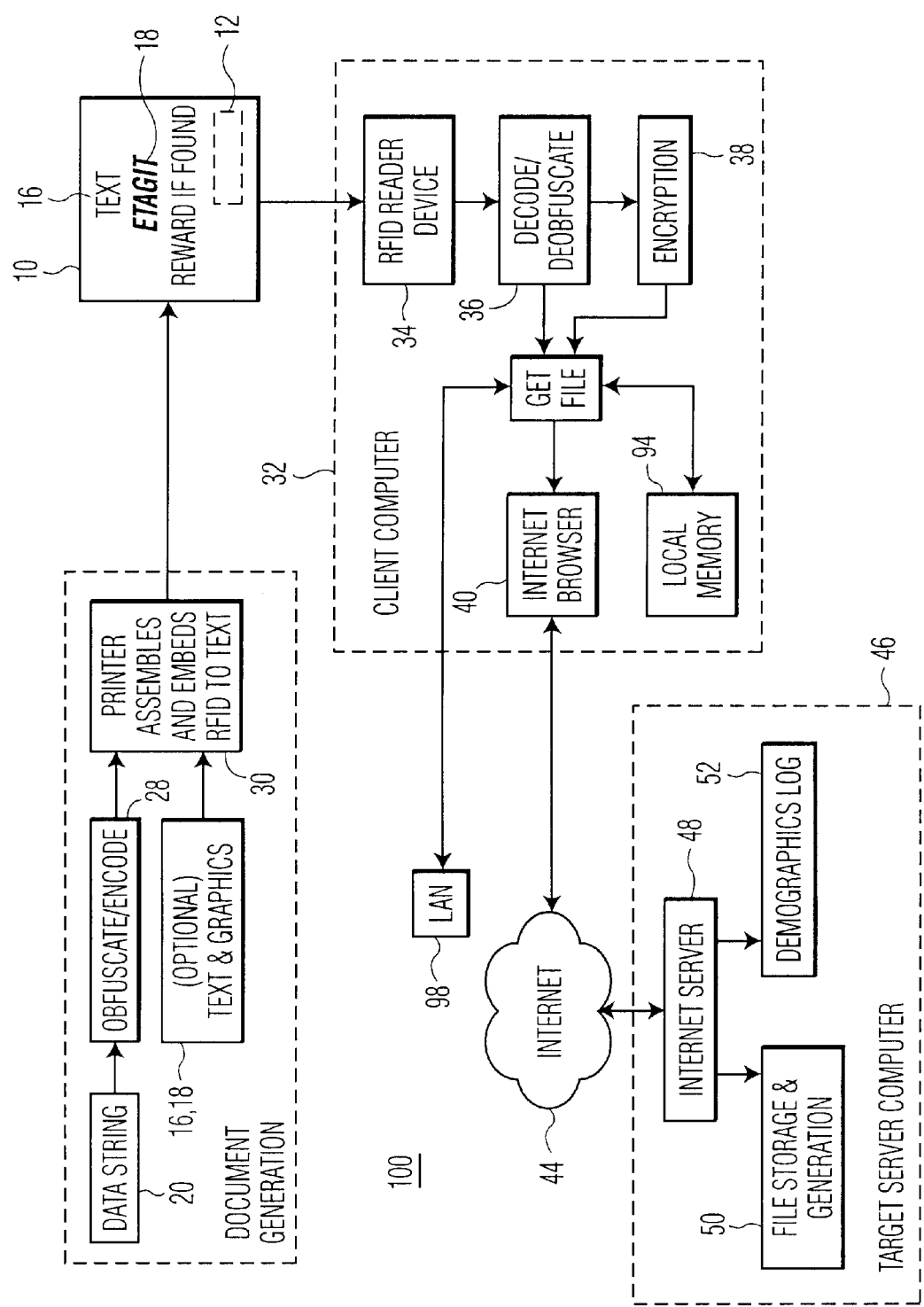
FIG. 1 is a diagram of the system of the present invention.

Referring first to FIG. 1, system 100 for generating and reading an intelligent tag or label 10 is illustrated in block diagram form in FIG. 1. The system 100 comprises an intelligent tag or label generation system 14, which encodes, assembles and prints an intelligent tag or label 10 for subsequent radio frequency-reading in conjunction with a client computer.

In operation, a vendor who wishes to provide an intelligent ID label or tag 10 programs certain parameters into a data string 20 which will be encoded within a radio frequency-readable code 12 and printed on the tag along with text 16 or graphics 18. The document may be an ID label informing the finder what do if the item is found or located by someone other than its owner.

RFID have several advantages over bar code labels in that there are no optical considerations and therefore the RFID tags will read through nonmetallic coatings of dirt, dust, paint, etc., without a decrease in performance. RFID eliminates common problems associated with bar code such as ability to change data, and read/write RFID provides the benefit of the ability to change data.

Inductive RFID tags 10 consist of silicon, a coiled, etched, or stamped antenna, a capacitor, a substrate, and may include a protective covering as well as an encapsulating sealant. Recently, thin, planar inductive tags have been introduced by Motorola under the "BiStatix" brand featuring wire, printed silver, etched, or stamped metal antennae on flexible substrates. The reduction from 200 turns of copper wire down to a half dozen turns of wire, printed silver etched or stamped metal coils and the elimination of a hard protective cover has substantially reduced tag cost. Customers today are seeking a better solution than bar code offers, while attempting to minimize the increased cost premium for the functionality provided by RFID. BiStatix works on a capacitive coupling principle. Electric fields are capacitively coupled to and from a reader and tag. As in an inductive system, a BiStatix reader/writer generates an excitation field which serves as both the tag's source of power and its master clock. The tag cyclically modulates its data contents and transmits them to the reader's receiver circuit. The reader demodulates and decodes the data signal and provides a formatted data packet to a host computer for further processing.

Unlike conventional inductive systems, BiStatix provides an elegantly simple and cost effective tag design, suitable for high volume or disposable applications. Capacitive coupling enables the elimination of costly coils, capacitors, leadframes, low resistance interconnects, and inflexible substrates. BiStatix tags are comprised of a silicon chip attached to printed carbon ink electrodes on the back side of a paper label on which there may be printed instructions such as a request to return the object in the case of this invention.

Tags are printable by a label converter using standard industry methods. Electrodes can assume virtually any size and shape, enabling the adaptability of BiStatix type RFID devices to applications using existing label stock. The RFID silicon is simply attached to the printed substrate. Motorola's tag-to-chip interconnect is facilitated by either direct chip attachment or by using an "interposer." An interposer is an intermediate attachment mechanism, a miniature tag itself. It is a small (typically ½" by ½"; square), self-adhering, paper label with printed ink electrode "stems" connected to the RFID silicon. Supplied in roll-form, interposers allow simple in-line integration with existing high speed label manufacturing processes with minimal impact to existing equipment.

Conventional RFID uses costly wire wound coils. BiStatix replaces the wire wound coils with inexpensive carbon ink applied by virtually all known printing techniques (e.g., flexographic, flat screen, rotary screen, pad print, gravure, spray, and brush). BiStatix enables low cost materials to be used for antenna substrates, including paper, plastic, fabric, etc. Additionally, BiStatix uses manufacturing processes that are commonly used in conventional web printing and converting used to make labels. This eliminates complex coil-winding and metal-deposition procedures and instead uses a simple flip-chip direct die attachment manufacturing process with common, available materials. This is used to create either "interposers" which can be attached to the user's printed electrode extensions, or the die can be directly attached to the tag electrodes. BiStatix silicon can be extremely thin. The actual chip is less than 250 microns thin. The chip is also relatively small. Its entire surface area is less than 3 mm. The benefit is that BiStatix can be easily applied in places where its presence should be undetectable, or at least unobtrusive. An example would be for ID dispensing tags or label where a roll of preprinted, BiStatix enabled, smart ID tags or labels would be programmed and dispensed from a printer. BiStatix could easily be fitted into the ID tag stock because of its low profile and ability to withstand flexing over rollers. Because the chip is small, and the antenna is thin (i.e., a layer of printed ink), BiStatix tags are extremely flat and most suitable as ID tags or labels.

BiStatix can be adapted to work in conjunction with existing bar code systems. A typical application is to put the BiStatix silicon and printed electrodes on the reverse side of a paper label with human readable and/or bar code information on the obverse side. BiStatix will take advantage of Motorola's patented dual technology readers. Dual technology reading will enable legacy bar code systems to be mixed with newer, BiStatix-enhanced bar coded labels, and BiStatix-only labels.

Figure 2:
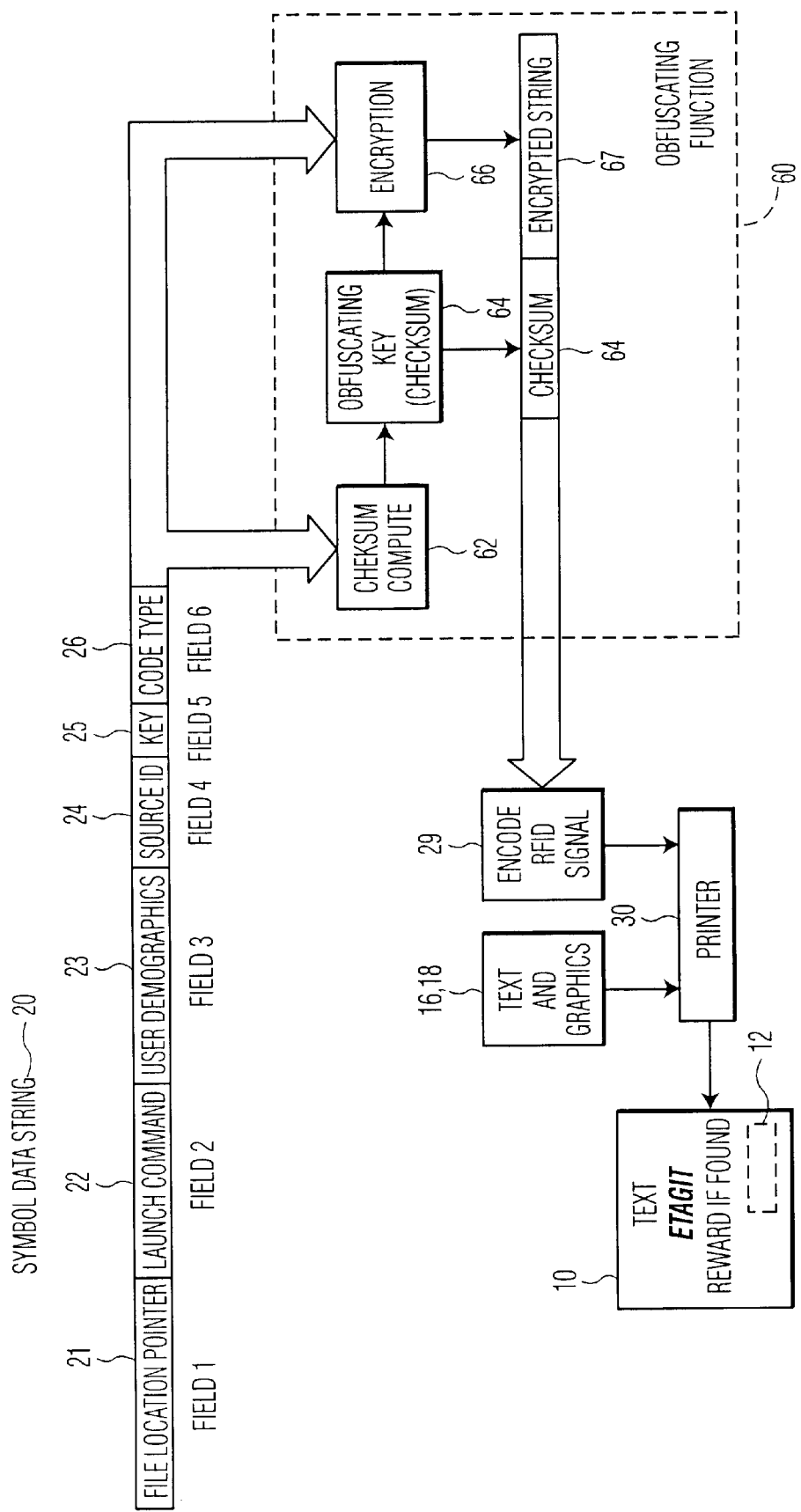
FIG. 2 is a diagram of the document generation function of FIG. 1.
Figure 3:
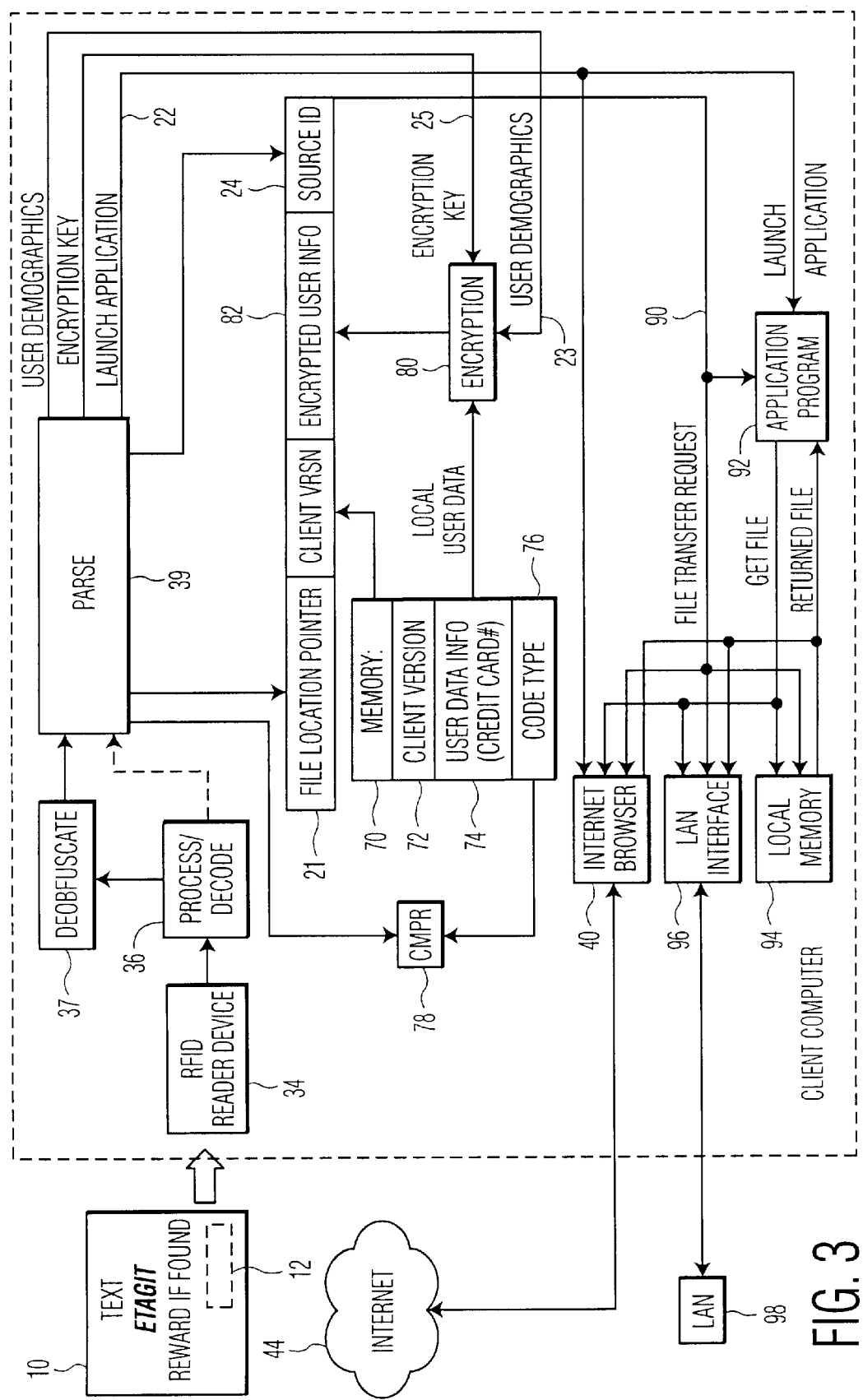
FIG. 3 is a diagram of the client computer functions of FIG. 1.

Parameters to be included within the radio frequency-readable code depend upon the application desired by the vendor. Referring now to FIG. 2, illustrates fields 1–6 of the symbol data string 20, may comprise a file location pointer 21, a launch command 22, a user identification field 23, a source identifier 24, an encryption key 25, and/or a code type field 26. For example, if the vendor wants the end-user to be able to access the vendor's Web site automatically upon reading the radio frequency ID information 12, then the parameters included in the radio frequency-readable tag may include the launch command 22 to launch an Internet browser application, such as a Uniform Resource Location (URL) code into the file location pointer 21, such as http://www.etagit.com. A printer 30 then utilizes the encoded data and desired text and graphics to print an intelligent document 10. The symbol data string 20 may also be obfuscated for security purposes, which will be described in detail below.

The intelligent document 10 is disseminated to the end user in accordance with the methods desired by the vendor. The vendor may be the seller of the tag or may be a seller of the object itself, in which case the tag may be affixed to the object before, at, or after it is sold to the owner, and the unique identification number can be pre-programmed. The serve 112 and/or 116 ((FIG. 5) can be updated at the time of sale with the owner's name, address, account information, phone, and the like. The account information can comprise credit card, bank account, package delivery service account information, debit card information, and the like.

When the object is lost, found, and returned to a designated location, a person at the location, after reading the text and graphics in the document, can access the Web site of the vendor by utilizing a Browser program such as NETSCAPE or by connection with a radio frequency-reader device 34 in conjunction with his client computer 32, programmed with appropriate software in accordance with the invention. That is, the user will read the code 12 with radio frequency-reader device. Alternatively, a back-up optical scanner sufficient to scan bar code symbols and the like is disclosed in U.S. Pat. No. 5,448,050, which is incorporated herein by reference, may be used as a back-up reader device. The device disclosed in the '050 patent is housed within a mouse type device, thus also including circuitry useful in point-and-click applications popular in personal computer platforms today.

After the radio frequency data is received by the tag reading device 34, a decoder 36 is used to decode the raw data into usable commands and data. The decoder is typically a software program executed by the microprocessor of the computer, and provides thereby to an Internet browser 40 the URL which had been encoded by the vendor into the symbol 12. The browser 40 application is then loaded (if not already running on the computer 32) by the launch command, and the URL is used to access the Web site of the vendor accordingly at the target server computer 46 via the Internet 44. As a result, the user may automatically access the vendor's Web site to obtain a computer file therein without having to enter the URL by a keyboard, thus eliminating all chances of error due to manual data input. The requested file is obtained from file storage and generation means 50, and sent to the client computer via the Internet for display to the user on the browser 40.

The above scenario is useful when a vendor prints and distributes such intelligent documents on a mass scale. That is, the symbol 12 distributed is the same for each user. In an alternative embodiment, specific identification information is included with the code to provide for personalized operation as follows. This scenario is useful when the vendor makes individual return shipment labels (i.e., Airbill number) keyed to individual users, such as when preprinted express shipment or courier labels are printed for inclusion on an envelope or box surrounding the located missing object.

In this case, the vendor may include in the user identification field 23 personal data such as the user's name, location, phone number, and other appropriate return and identification information.

The code may also include security information useful in completing secure transfers across the Internet. For example, an encryption key 25 appropriate in a public or private key system may be embedded within the symbol 12. An appropriate software routine in the user's computer utilizes the key after decoding it in order to encrypt certain data being sent across the Internet. For example, the encryption of credit card information is desired in order to thwart would-be intruders from misappropriating the information. The system of the present invention could be used to allow the user to order an item advertised in the brochure by taking the credit card number, already resident in the user's computer memory, and encrypting it with the key decoded from the code. When the user desires to purchase the item, he reads the associated radio frequency code, and the credit card number is encrypted and transmitted as the Web site is accessed. The target server computer can match the source identifier string 24 sent with the transmission with the appropriate decryption key stored in a lookup table at the target server or on an external computer, and decrypt the credit card number accordingly.

The system 10 of the present invention has additional embodiments that allow quick and easy retrieval of a data file on an intranet or Local Area Network (LAN). Thus, a distributor or manufacturer of a product may distribute fliers regarding registering and enrolling in a service that provides smart ID tags or labels that encode appropriate document access information in accordance with the teachings of the invention. The user may obtain further information by reading the radio frequency ID information on the smart tag or label, which then causes his computer to access his network, file server, etc.

FIG. 2 is an illustration of the obfuscation function of the present invention. Prior to being encoded, the identification data string may optionally be obfuscated in order to improve the security aspects of the system. The identification data string is input into a checksum computing means 62, which then computes the checksum of the symbol data string in accordance with teachings well known in the prior art. The computed checksum is then used as a key in an encryption scheme 66 which may be one of several well known encryption methodologies known in the prior art. The key 64 is assembled in the clear (i.e., unencrypted) along with the encrypted symbol data string into by the encoding function 29. After this encrypted data string and cleared checksum data is encoded, it is rendered by the printer 30 in accordance with methods well known in the art and the intelligent document is thereby generated.

Figure 4:
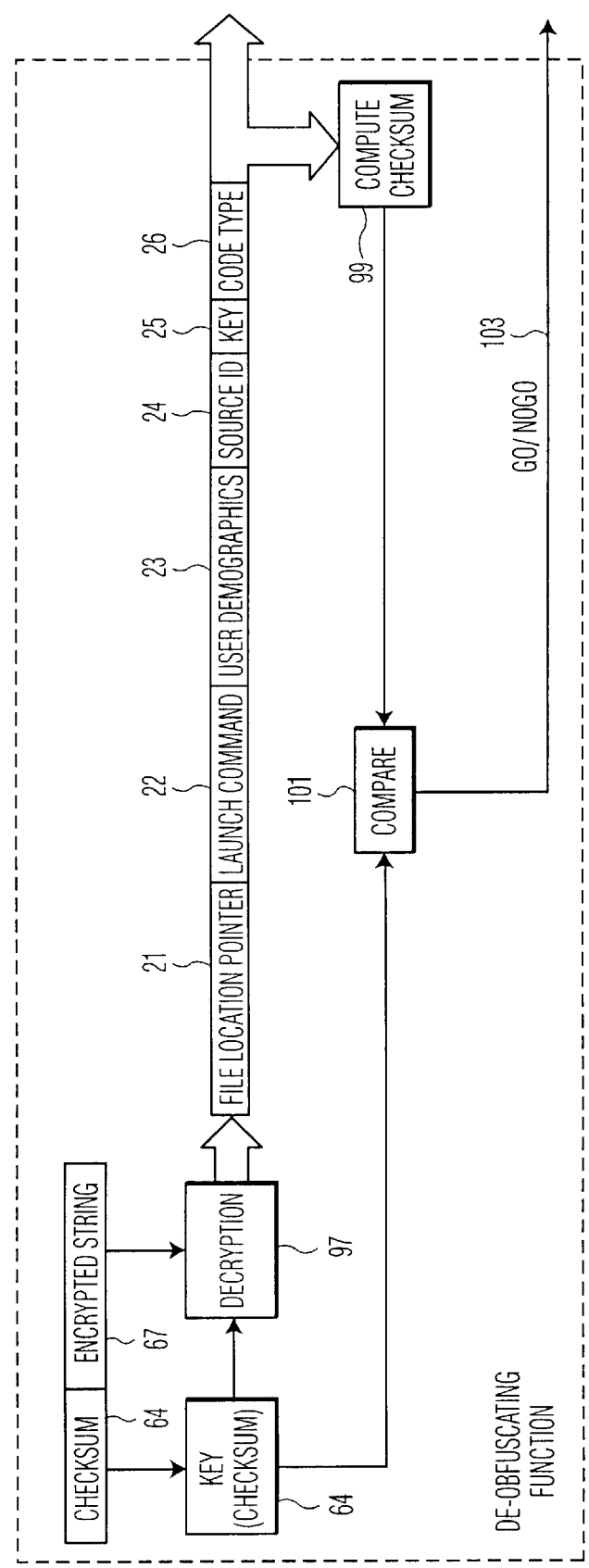
FIG. 4 is a diagram of the deobfuscating function carried out by the client computer of FIG. 3.

After the intelligent document 10 is distributed to the user, the radio frequency readable ID 12 is received by a receiving reader device, 34 and processed as follows. The radio frequency ID data is decoded by means well known in the art in accordance with the particular symbology implemented to encode the symbol 12. Once the symbol data has been decoded, it is deobfuscated (if the original symbol data had been obfuscated as described above) by deobfuscation function 37 which is illustrated in detail in FIG. 4. First, the clear checksum 64 is utilized as a key to decryption function 97 to decrypt the encrypted string 67. The decryption function 97 which was preloaded onto the client computer as part of an initialization process with the system is a corollary to the encryption function 66. By passing the checksum 64 in the clear and utilizing it as the key, it enables the client computer and document generation computing means to be synchronous with respect to the encryption methodology. After the decryption function 97 produces the clear data string comprising the original file location pointer 21, launch command 22, user demographics 23, source ID 24, key 25 and code type 26, then the checksum computing means 99 operates to compute a checksum of those fields. That computed checksum is then compared by comparison block 101 with the received clear checksum 64 that was decoded by the decoding process 36. If the comparison process 101 indicates that the computed checksum equals the received clear checksum, then go/no go signal 103 indicates that the data transmission and decryption process was successful. If, however, the checksums are not favorably compared, then the go/no go signal 103 will indicate an unsuccessful transmission and decryption process. If this is unsuccessful, then further processing is aborted.

Once the symbol data is deobfuscated, it is then parsed by parsing block 39 in order to utilize the constituent fields as follows. The file location pointer 21 and source identifier string 24 are assembled into a register that will comprise the file transfer request. The file transfer request register is also loaded with a client version 72 taken from local memory 70 on the client computer. The user demographic string 23 is optionally fed into an encryption block 80 which is then used with encryption key 25 to encrypt that data and put the results as encrypted user information 82 into the file transfer request string 90. Optionally, the encryption function 80 may utilize certain local user data 74 that had been stored on the memory 70 of the client computer. This local user data may comprise sensitive information, such as the user's credit card number. Advantageously by encrypting this information the user will have a higher level of confidence that this sensitive information can be transmitted over the Internet for applications such as electronic commerce. Thus, the file transfer request register 90 will comprise the file location pointer 21, the client version 72, certain encrypted user information 82 and the source identifier 22.

The code type string 26 is compared by block 78 to the internally stored code type 76. If the comparison is unsuccessful, then further processing is aborted. This process is useful to enable certain versions of the client software to be distributed such as on a demonstration or trial basis, and this trial software will only work with certain documents generated by corresponding document generation software modules. Thus, a user having a trial version will not be able to fully utilize the system until it purchases by license or otherwise the production version. Utilization of this type of code type matching also enables the system vendor to control expired memberships in a 'lost and found' retrieval service, etc.

Once the file transfer request has been successfully assembled, it is then sent to the appropriate interface in order to obtain the requested file. In the preferred embodiment, the file transfer request will take the form of a uniform resource locator (URL) which will be sent to the Internet browser software 40 that is resident and on the client computer. Optionally, if the file transfer request string indicates that the file is located on a Local Area Network such as LAN 98, then the file transfer request will be transmitted through the LAN interface 96 of the client computer in order to obtain the correct file. Further optionally as described above, the file transfer request may seek to obtain a file stored in local memory, such as on the user's hard drive 94.

Figure 5:
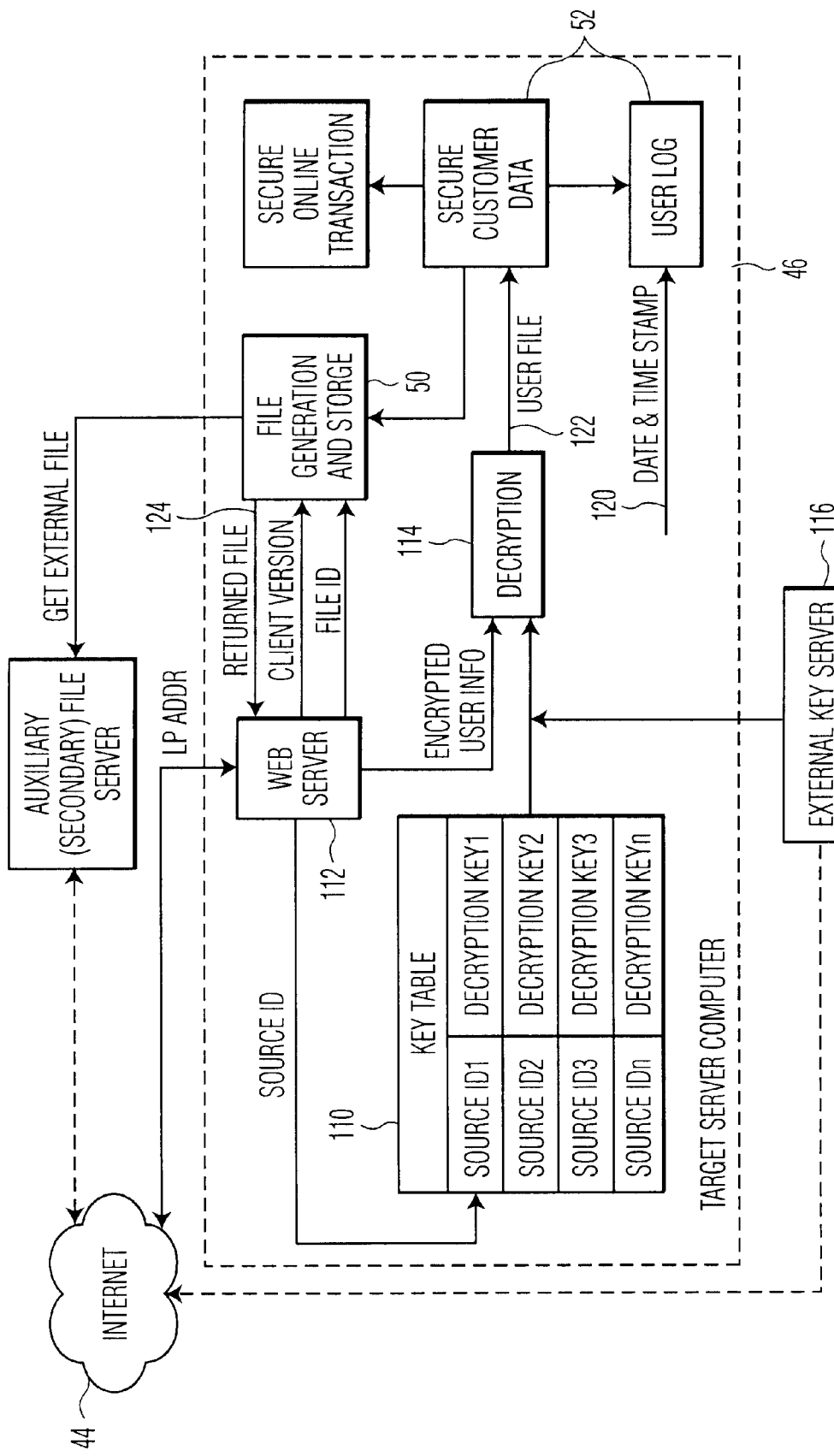
FIG. 5 is a diagram of the target server computer of FIG. 1.

Referring to FIG. 5, the operation of the target server computer will now be described in detail. When the file transfer request 90 indicates that the file to be retrieved is located on an Internet file server, then the file location pointer 21 will comprise a URL, which comprises an IP address (Internet Protocol), as well as a file identifier. The IP address, as is well known in the art, is the address of the target server computer on the Internet. The Web server program 112 that is running on the target server computer 46 receives the URL over the Internet 44 and strips out certain parameters contained therein. The source identifier 24 is used to access a look up table 110 which comprises a plurality of source identifier strings and their associated decryption keys. This decryption key that is obtained from the key table 110 is then used by decryption block 114 to decrypt the encrypted user information received in the file transfer request. Decryption function 114 is corollary to the encryption function 80 performed at the client computer. Thus, the secure information transferred with the file transfer request is decrypted and user information file 122 may be stored in user log 52, along with the date and time stamp 120 to indicate when the particular request was received. This information is quite valuable to the vendor, since it enables it to determine the name and other useful information relating to users who have accessed its Web site. This information may also be utilized by file generation and storage means 50 to dynamically determine the file or files to be sent back to the client computer. For example, if the identification data indicates that the user would prefer the file returned back in a language other than English, that file can be accessed or generated appropriately. Thus, in addition to retrieving a static page stored in the target server computer, the system of the present invention allows dynamic generation and return of computer files in accordance with user's preferences indicated in the transfer request. In addition, as described herein, if the user has allowed his credit card number to be encrypted and sent with the file transfer request, then the target server computer can decrypt the credit card number and utilize it to perform a secure on-line transaction.

In the alternative to having a file resident on the target server computer, it may be required for the target server computer to access an auxiliary file server 118 to get the external file and return it back to the client computer. The auxiliary file server 118 may be accessed directly, through a dial up modem connection, or through the Internet. In addition, an external key server 116 is accessible by the target server computer if it is desired by the system designer to keep the key table 110 remote from the target server computer, rather than local therein. By keeping a key table 110 at a central server location, the system provider can keep track of server requests to decrypt user information and charge a fee accordingly. Thus, a vendor utilizing this system may have the option of paying a "per click" fee to determine the user demographics of each user that accesses his server or may just provide files back to the user without obtaining that knowledge on a less costly basis.

When the file is returned back to the client computer through the Internet 44, it may be displayed in a manner well known in the art on the Internet browser 40. Thus, the system of the present invention has provided an easy and error proof way for a user to obtain a computer file from an Internet server computer by simply reading the radio frequency ID code provided on an intelligent tag or label and having the client automatically process the code, request the file wherein the file is then returned by the target server computer and displayed to the user.

Figure 6:
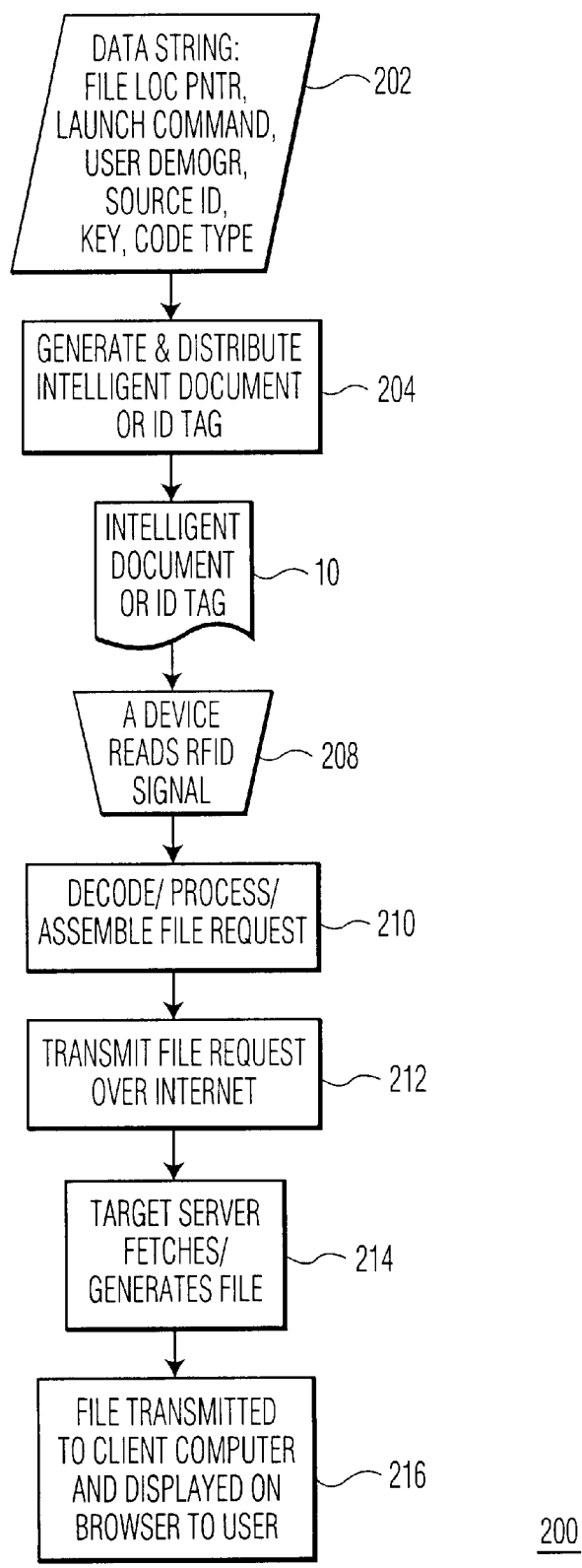
FIG. 6 is a top level flowchart of the method of the present invention.

FIGS. 6 through 10 illustrate the flowcharts of the methodologies employed by the present invention. FIG. 6 is an overall flowchart wherein step 202 illustrates the data string comprising the file location pointer, launch command, user demographics, source identifier, key and code type. At block 204, the data string is utilized to generate an intelligent ID tag or label 10 which is also distributed to the end users. At step 208, the radio frequency tag is read, and at step 210 the data is decoded and processed and the file request is assembled. At step 212 the file request is transmitted over the Internet and at step 214 the target server fetches and/or generates the computer file requested. Finally, at step 216 the file is transmitted to the client computer and displayed on the browser to the user.

Figure 7:
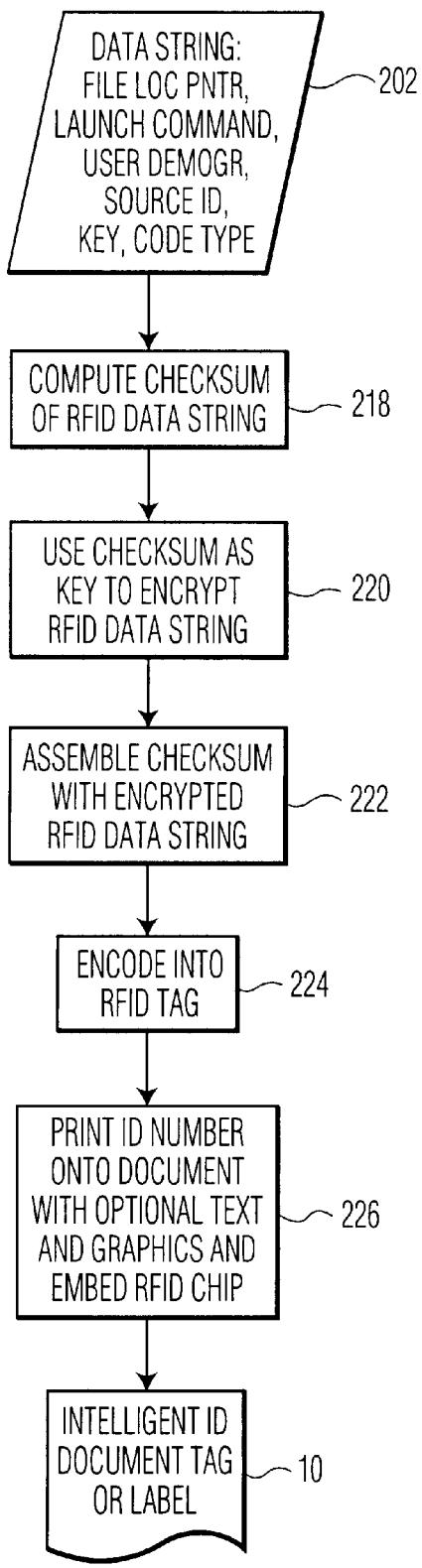
FIG. 7 is a flowchart of the document generation of the present invention.

FIG. 7 is a more detailed flowchart of the document generation procedure. The data string at 202 is used to compute a checksum at step 218. At step 220, the checksum is used to encrypt the data string and at step 222 the checksum and encrypted data string are assembled. At step 224 the radio frequency-readable code is encoded and at step 226 the radio frequency smart tag or label is printed with optional text and graphics onto the intelligent document 10.

Figure 8:
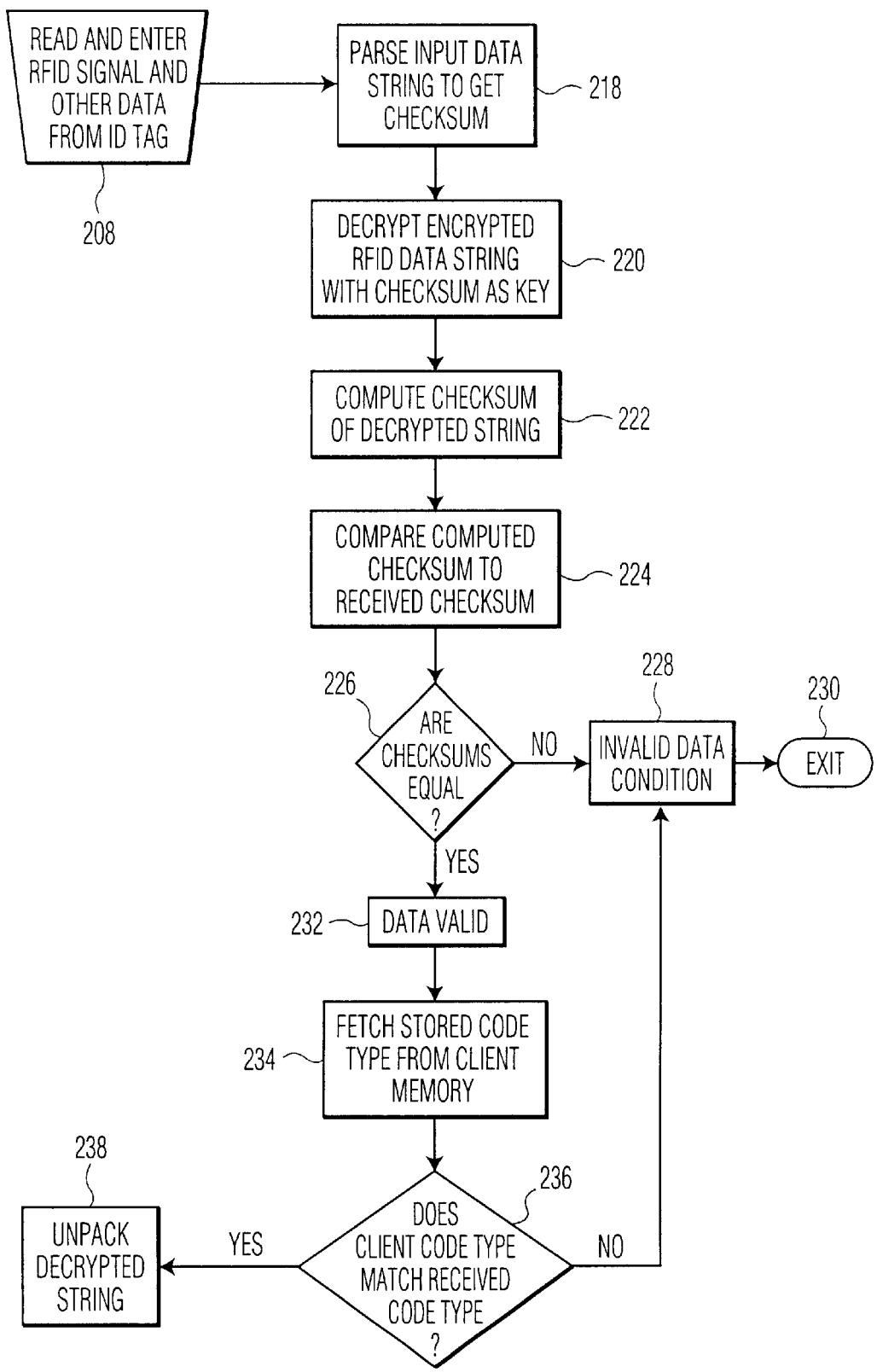
FIGS. 8 and 9 are a flowchart of the radio frequency-reading and processing by the client computer of the present invention.
Figure 9:
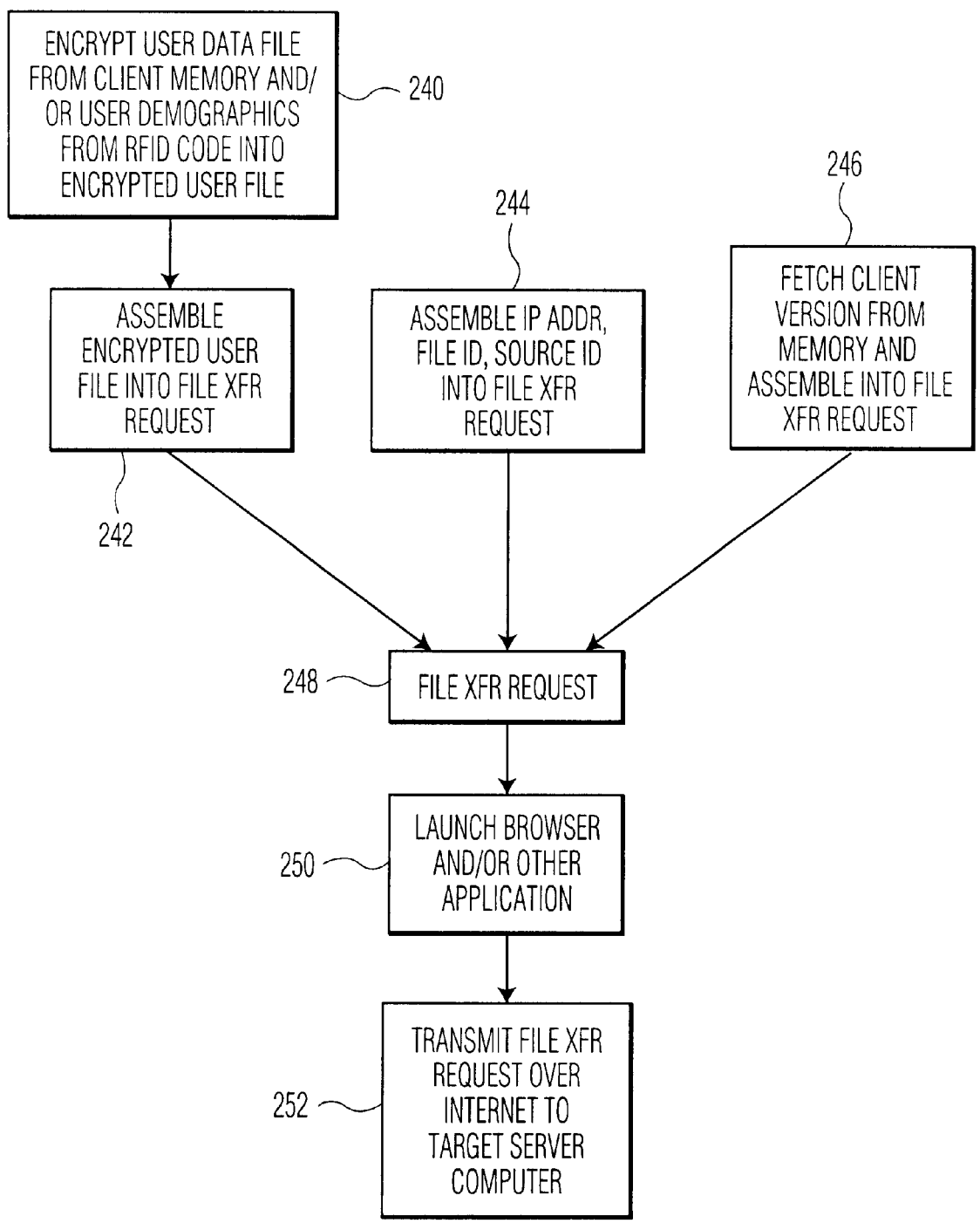

FIGS. 8 and 9 illustrate the detailed operation of the client computer. At step 208 in FIG. 8, the radio frequency ID code is read. At step 218 the input data string is parsed in order to derive the checksum and it is then decrypted with the checksum as the key. The decrypted string is used to computer a checksum and the received checksum is compared with the computed checksum. If the checksums are not equal, an invalid condition is declared and the process exits at step 230. If data is indicated valid at step 232, then the stored code type is fetched from the client's memory at step 234. A comparison of the code type from the client memory with the received code type is compared at step 230. If an invalid data condition is indicated in this test, then the process exits at step 230 and if the code types match, then the process continues with an unpacking of the decrypted string at step 238.

Referring now to FIG. 9, the step 240 will encrypt the user data file from the client memory and optionally the user demographics received from the bar code to generate an encrypted user file. At step 242, the encrypted user file is assembled into the file transfer request 248. At step 244, the file location pointer comprising the IP address and file ID and the source ID are also assembled into the file transfer request and at step 246, the client version is fetched from local memory and assembled into the file transfer request. At step 250, the browser is provided with the file transfer request and is optionally started by the launch command in the received string. At step 252, the file transfer request is transmitted to the target server, preferably in the preferred embodiment over the Internet in order to obtain the requested file.

Figure 10:
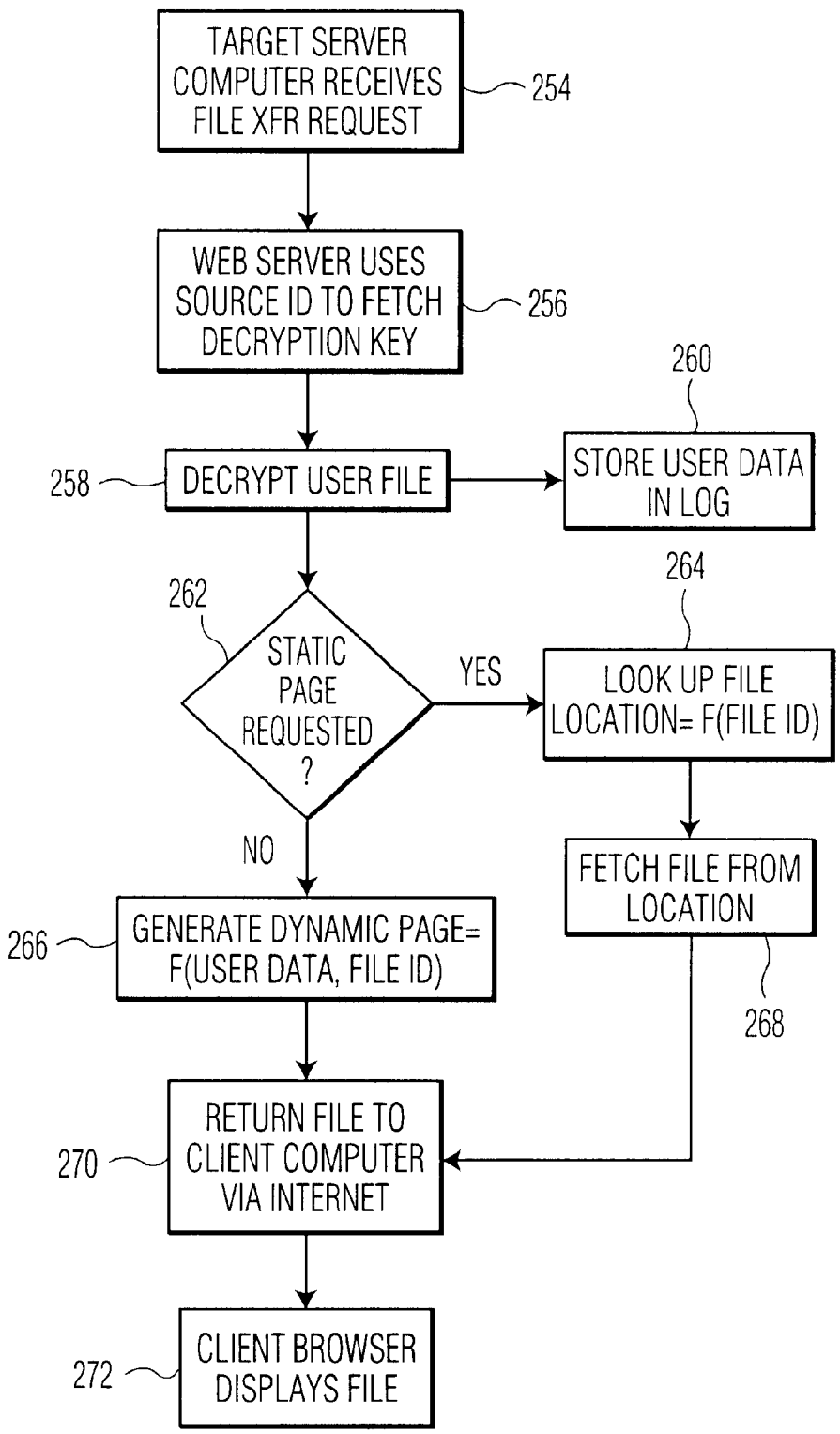
FIGS. 10 and 11 are flowchart of method used by the target server computer of the present invention.

FIG. 10 illustrates the details of the methodologies employed by the target server computer. At step 254, the target server computer receives the file transfer request, and at step 256 the Web server program running on the target server computer uses the received source identifier to fetch the associated decryption key which may be internal or externally located. At step 258, the user file is decrypted and the user data is stored in a log. If the static page has been requested by the user, then the file location is looked up as a function of the file identifier. At step 264, the file is fetched from that location at step 268 and returned to the client computer via the Internet at step 270. If the static page was not requested at block 262, then a dynamic page is generated at step 266 which typically will be a function of the file identifier and/or the user data that had been received and decrypted. Again, the file is then returned to the client computer by the Internet and displayed on the user's browser at step 272.

Figure 11:
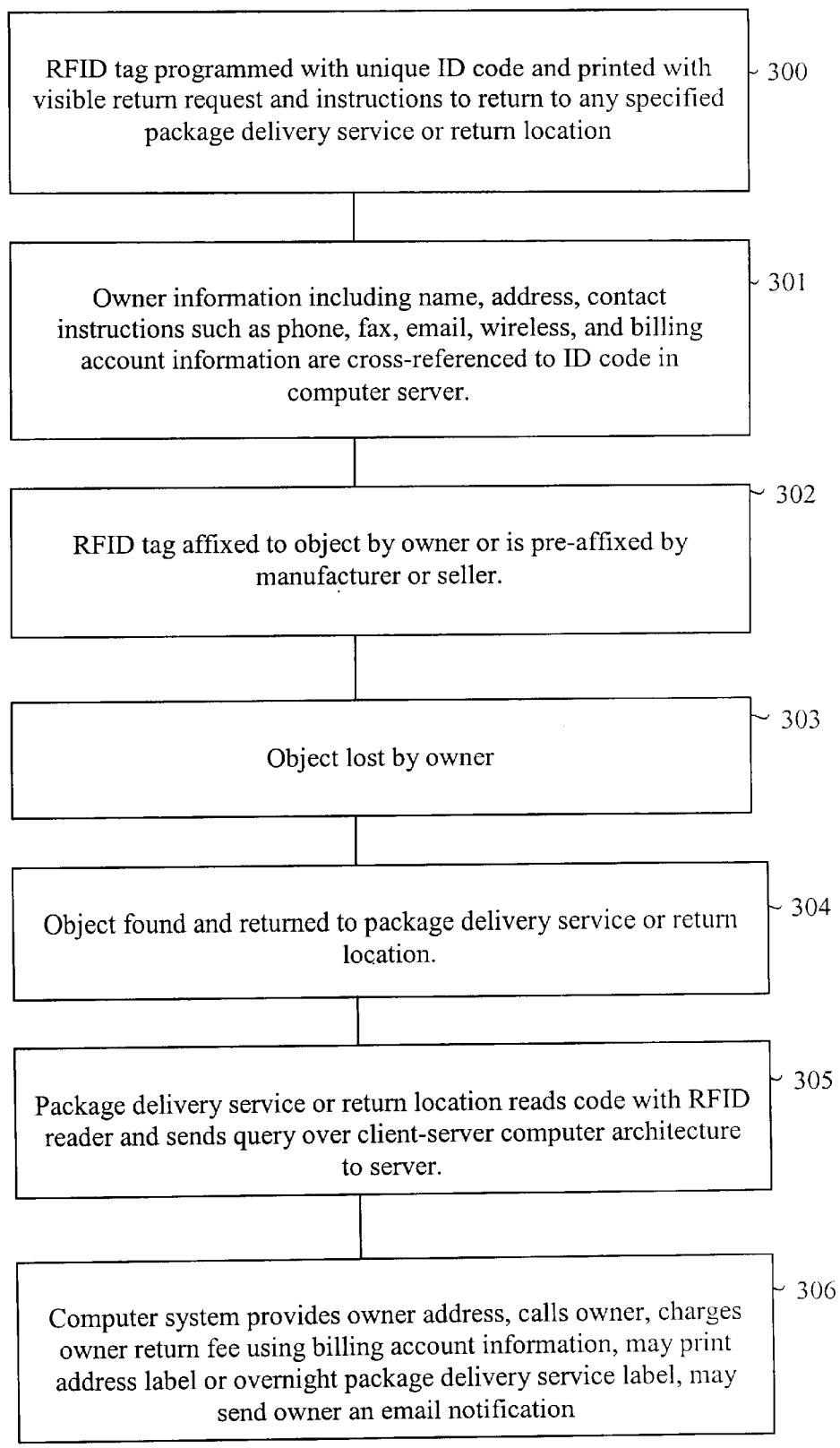

Referring now to FIG. 11, RFID tags are programmed with unique identification codes and printed with a standard visible return request and instructions to return the object if found to any specified package delivery service or return location 300. The package delivery service can be a specific brand such as Federal Express, UPS, Airborne Express, US Postal Service, other government postal service, and the like, and a return location can be any location where there is an RFID tag reader. For example a chain of stores such as Radio Shack or Sears may provide RFID readers at each location and may work in conjunction with the provider of RFID tags. In some embodiments the chain of stores may provide the tags on the objects it sells.

Owner information 301 is cross reference to the ID code in a computer system such as a computer server. The owner information can include name, address, contact instructions such as phone, fax, email, or wireless information. The owner information should also include billing account information such as credit card, package delivery service, account numbers, or debit card information. The billing account information will be used later if the object is lost and then returned through the system of the invention.

The RFID tag may be affixed 302 to the object by the owner after the object is purchased or may be pre-affixed by the manufacturer or seller. If the object is lost 303 by the owner and then found 304, the finder is requested by the printed label to return the object to, for example, a package delivery service or a return location such as the aforementioned stores.

Upon receipt of the object at the package deliver service or return location, the RFID tag is read with a RFID reader and the code is sent 305 as a query over, for example a client server computer architecture to a computer system comprising a server. The computer system provides 306 owner address information and charges the owner a return fee using the billing account information. The system may also direct a telephone call or e-mail to the owner and may print address labels or overnight package delivery service labels, or provide other automated features to expedite return of the object to the owner.

Although the invention has been described in conjunction with specific embodiments, other alternatives, modifications, variations and improvements should become readily apparent to those skilled in the art without departing from the spirit and scope of the invention.

What is claimed is:

1. A method for returning lost objects to their owners comprising providing a radio frequency identification (RFID) tag to the owner for application to the owner's object or supplying the object with the tag preaffixed, the tag having a unique identification code number electronically recorded within the tag and a visible printed request to any finder to contact a package delivery service;

storing the unique identification code number and corresponding owner information, including owner address information and owner billing account information, in a computer system which is accessible over the Internet by the package delivery service;

providing RFID tag readers at the package delivery services;

upon return of any lost object to a package delivery service, reading the RFID tag identification code number, accessing the corresponding owner information over the Internet from the computer system, returning the object to the owner, and using the owner's billing account information to charge the owner for the return of the object to the owner.

2. Method of claim 1 wherein the printed instructions include a promise of a reward if the finder returns the object to the package delivery service.

3. Method of claim 1 further including automatically notifying the owner that the object has been found, that it is being returned to the owner's address recorded in the computer system, and that the owner's credit card is being charged for the return delivery and any reward paid by the package delivery service to the finder of the lost object.

4. Method of claim 1 including notifying the owner by Internet e-mail or phone.

5. Method of claim 1 wherein the tag identification read by the RFID reading device is sent by the package delivery service as a query to a remote computer system over the Internet and the remote computer system answers the query by providing owner identification information, and the package delivery service in turn uses the owner information to return the object to the owner.

6. Method of claim 1 wherein the RFID tag can be electronically updated.

7. Method of claim 1 wherein the RFID tag also has delivery and account information electronically recorded thereon.

8. Method of claim 1 further including a) encoding a RFID signal into an automated data capture file location pointer into a radio frequency readable identification (ID) code number;

b) rendering said radio frequency-readable code number within a data carrier;

c) transposing an input data string from said radio frequency-readable ID code number with a computer input device coupled to said client computer;

d) parsing said input data string to determine said file location pointer; and e) utilizing said file location pointer to request the computer file designated thereby.

* * * * *